United States Patent
Huang et al.

(10) Patent No.: US 8,859,674 B2
(45) Date of Patent: Oct. 14, 2014

(54) MOISTURE CURABLE SILYLATED POLYMER COMPOSITIONS WITH IMPROVED ADHESION TO CONCRETE

(75) Inventors: Misty Huang, New City, NY (US); Jeries Nesheiwat, Ardsley, NY (US)

(73) Assignee: Momentive Performance Materials Inc., Waterford, NY (US)

( * ) Notice: Subject to any disclaimer, the term of this patent is extended or adjusted under 35 U.S.C. 154(b) by 688 days.

(21) Appl. No.: 13/077,077

(22) Filed: Mar. 31, 2011

(65) Prior Publication Data

US 2012/0251832 A1 Oct. 4, 2012

(51) Int. Cl.

| | | |
|---|---|---|
| *C08G 18/08* | (2006.01) |
| *C08G 18/28* | (2006.01) |
| *C08G 77/00* | (2006.01) |
| *C08G 77/04* | (2006.01) |
| *C08G 77/06* | (2006.01) |
| *C08G 77/20* | (2006.01) |
| *C08G 77/26* | (2006.01) |
| *C08L 75/00* | (2006.01) |
| *C08L 83/00* | (2006.01) |
| *C08L 83/04* | (2006.01) |
| *B05D 3/02* | (2006.01) |
| *B32B 27/00* | (2006.01) |
| *B32B 27/40* | (2006.01) |
| *C08G 18/75* | (2006.01) |
| *C08L 71/02* | (2006.01) |
| *C08G 18/10* | (2006.01) |
| *C08G 18/48* | (2006.01) |
| *C09J 175/04* | (2006.01) |
| *C08G 65/336* | (2006.01) |
| *C09J 171/02* | (2006.01) |

(52) U.S. Cl.
CPC .............. *C08G 18/48* (2013.01); *C08G 18/755* (2013.01); *C08L 71/02* (2013.01); *C08G 18/10* (2013.01); *C09J 175/04* (2013.01); *C08G 65/336* (2013.01); *C09J 171/02* (2013.01)

USPC ........... 524/588; 524/589; 524/590; 524/837; 528/10; 528/22; 528/32; 528/34; 528/38; 427/372.2; 427/385.5; 427/387; 428/423.1; 428/447

(58) Field of Classification Search
USPC ........ 524/588, 837, 589, 590; 528/10, 22, 32, 528/34, 38
See application file for complete search history.

(56) References Cited

U.S. PATENT DOCUMENTS

| | | |
|---|---|---|
| 3,627,722 A | 12/1971 | Seiter |
| 4,810,748 A | 3/1989 | Spells |
| 5,990,257 A | 11/1999 | Johnston et al. |
| 6,001,946 A | 12/1999 | Waldman et al. |
| 6,197,912 B1 | 3/2001 | Huang et al. |
| 6,498,210 B1 | 12/2002 | Wang et al. |
| 6,602,964 B2 | 8/2003 | Huang et al. |
| 7,319,128 B2 | 1/2008 | Ziche et al. |
| 2006/0173121 A1 | 8/2006 | Tamai |
| 2007/0066768 A1 | 3/2007 | Gauthier et al. |
| 2010/0317796 A1 | 12/2010 | Huang et al. |

FOREIGN PATENT DOCUMENTS

EP 0307954 3/1989

*Primary Examiner* — Patrick Niland
(74) *Attorney, Agent, or Firm* — Dominick G. Vicari; Joseph S. Ostroff

(57) ABSTRACT

A moisture-curable resin composition comprising (a) at least one moisture-curable polymer having at least one hydrolysable silyl group; (b) at least one hydrocarbylalkoxysilane; and (c) at least one silane adhesion promoter containing a glycidoxy group. The composition may also contain additives including a catalyst for catalyzing the reaction between the moisture-curable polymer having at least one hydrolysable silyl group (a) with water under curing conditions, a filler, a plasticizer, and combinations thereof. The moisture-curable resin composition is useful in the production of adhesives, sealants and coatings for use in primerless concrete applications.

22 Claims, No Drawings

MOISTURE CURABLE SILYLATED POLYMER COMPOSITIONS WITH IMPROVED ADHESION TO CONCRETE

FIELD OF THE INVENTION

The present invention relates to moisture-curable resin compositions, which upon curing provide cured compositions having improved adhesion to unprimed concrete substrates when immersed in water for at least seven days. More particularly, the present invention relates to moisture-curable resin compositions comprising silylated polymers, hydrocarbylalkoxysilanes and silane adhesion promoters, and to moisture-curable sealant, adhesive and coating compositions containing these moisture-curable resin compositions and articles made therefrom.

BACKGROUND OF THE INVENTION

Hydrolysable silane-terminated polymers are commonly used in the marketplace of adhesives, sealants and coatings. This is at least partially attributed to their environmental durability and adhesion properties to many substrates, such as glass, aluminum and plastics. Hydrolysable silane-terminated polymers and their use in sealants, adhesives and coatings have been disclosed in the art. Illustratively, U.S. Pat. No. 3,627,722 discloses polyurethane sealants made from an isocyanate-terminated polymer, wherein at least five percent of the isocyanate groups are end-blocked with trialkoxysilyl groups. U.S. Pat. No. 5,990,257 discloses silylated polyurethanes prepared by using extremely low-unsaturation polyether polyols in the formation of the polyurethane prepolymers that are silylated. The '257 patent discloses that these silylated polyurethanes exhibit improved mechanical properties upon curing to a low-tack sealant. Likewise, U.S. Pat. No. 6,498,210 describes a silylated polyurethane polymer containing unreacted isocyanate groups or low molecular weight terminators. The '210 patent discloses that such polymers provide improved tensile strength after cure. Moreover, U.S. Pat. No. 6,001,946 discloses a class of N-silylalkyl-aspartic acid ester-terminated polyurethane polymers and sealant formulations made from the silylated polymers that are said to exhibit improved elongation, tensile strength and tear resistance. U.S. Pat. No. 6,001,946 discloses curable silane-terminated polymers based upon maleate-adducts of aminoalkylsilanes. U.S. Pat. No. 7,319,128 discloses organyloxysilyl-terminated polymers obtained by reacting hydroxyl-terminated organic polymers with isocyanato-functional silanes in the presence of a catalyst.

Unfortunately, conventional coatings, adhesives and sealants based upon these hydrolysable silane-terminated polymers tend to have poor wet soak adhesion to unprimed concrete substrates after they are cured. Efforts have been made to improve the adhesion to unprimed concrete substrates of the products made from the silylated polymers. Illustratively, U.S. Pat. No. 4,810,748 discloses the use an epoxy-functional silicone fluid additive to a silicone sealant to improve adhesion. U.S. Pat. No. 5,216,057 discloses improved wet soak adhesion of acrylic latex sealants on mortar that contain a polysiloxane oil emulsion. U.S. Pat. No. 6,602,964 discloses the use of polysilsesquioxanes containing mercapto- and alkyl-functional groups to improve the adhesion of a silylated polyurethane composition. Likewise, U.S. Published Patent Application No. 2007/0066768 discloses silylated polyurethane compositions containing a blend of silanes and polysiloxanes to improve the adhesion to concrete after exposure to water. Although these efforts have shown some improvement in adhesion to unprimed concrete, these resin compositions tend to undergo adhesive mode failure and have low peel strength when the cured compositions on unprimed concrete are immersed in water for seven days or longer.

Accordingly, there is a continuing need in the hydrolysable silane-terminated polymers community for a resin composition that has high peel strengths and cohesive failure mode from unprimed concrete substrates, which have been immersed in water for at least seven days. The present invention provides one solution to that need.

SUMMARY OF THE INVENTION

One aspect of the present invention relates to a moisture-curable resin composition comprising: (a) at least one moisture-curable polymer having at least one hydrolysable silyl group; (b) at least one hydrocarbylalkoxysilane; and (c) at least one silane adhesion promoter containing a glycidoxy group, wherein
(i) the amount of said component (b) present in the moisture-curable resin composition is from about 5 to about 35 weight percent based upon the weight of said component (a);
(ii) the amount of said component (c) present in the moisture-curable resin composition is from about 1 to about 25 weight percent based upon the weight of said component (a);
(iii) the total amount of said component (b) and said component (c) present in the moisture-curable resin composition is from about 10 to about 45 weight percent based upon the weight of said component (a);
with the provisos that
(i) the moisture-curable resin composition is substantially free of hydroxyl-terminated dimethyl siloxane; and
(ii) the moisture-curable resin composition is substantially free of low molecular weight glycols.

In an embodiment of the above composition, the moisture-curable polymer (a) has the general Formula (I):

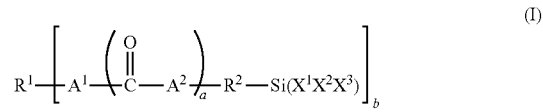

wherein:
$R^1$ is independently a monovalent or polyvalent organic polymer fragment having a number average molecular weight of from 500 to 25,000 grams per mole (g/mol);

each occurrence of $R^2$ is independently a divalent hydrocarbylene group containing from 1 to 12 carbon atoms;

each occurrence of $A^1$ is independently selected from divalent oxygen (—O—), sulfur (—S—) or substituted nitrogen of the structure $(-)_2NR^3$, wherein $R^3$ is hydrogen, alkyl, alkenyl, arenyl, aryl, aralkyl, alkyl containing at least one ester functional group or —$R^2SiX^1X^2X^3$ group, wherein each $R^3$, other than hydrogen, contains from 1 to 18 carbon atoms, and with the provisos that when $A^1$ is oxygen or sulfur, then $A^2$ is $(-)_2NR^3$ and when a is 0, then $A^1$ is oxygen;

each occurrence of $A^2$ is independently selected from divalent oxygen (—O—), sulfur (—S—) or substituted nitrogen of the structure $(-)_2NR^3$, wherein $R^3$ is hydrogen, alkyl, alkenyl, arenyl, aryl, aralkyl, alkyl containing at least one ester functional group or —$R^2SiX^1X^2X^3$ group, wherein each $R^3$, other than hydrogen, contains from 1 to 18 carbon atoms, and with the proviso that when $A^2$ is oxygen or sulfur, then $A^1$ is $(-)_2NR^3$;

each occurrence of $X^1$ is independently $R^4O$—, wherein each $R^4$ is independently selected from the group consisting of hydrogen, alkyl, alkenyl, arenyl, aryl, and aralkyl groups, wherein each $R^4$, other than hydrogen, contains from 1 to 18 carbon atoms and, optionally, contains at least one oxygen or sulfur atom;

each occurrence of $X^2$ and $X^3$ is independently selected from the group consisting of $R^4O$— and $R^5$ wherein each $R^4$ is independently selected from the group consisting of hydrogen, alkyl, alkenyl, arenyl, aryl, and aralkyl, wherein each $R^4$, other than hydrogen, contains from 1 to 18 carbon atoms and, optionally, contains at least one oxygen or sulfur atom and each $R^5$ is independently an alkyl group containing from 1 to 6 carbon atoms; and, each occurrence of subscripts a and b is independently an integer wherein a is 0 or 1 and b is 1 to 6.

The hydrocarbylalkoxysilane (b) of the present invention is a compound of the general Formula (II):

   Formula (II)

wherein c is 0 or 1, and $R^6$ is an alkyl or an alkenyl group of 2 to 18 carbon atoms.

The silane adhesion promoter (c) of the present invention is a compound of the general Formula (III):

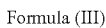 Formula (III)
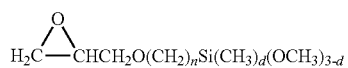

wherein d is 0, 1, or 2, and n is 2 to 6;

In another aspect, the present invention is directed to a cured composition prepared from curing the aforementioned moisture-curable composition.

In yet another aspect, the present invention relates to sealants, adhesives, and coatings containing the aforementioned moisture-curable composition.

In still yet another aspect, the present invention relates to an article comprising a cured composition prepared from the curing of the aforementioned moisture-curable resin composition and an unprimed concrete to which the cured moisture-curable resin composition is bonded.

These and other aspects will become apparent upon reading the following detailed description of the invention.

DETAILED DESCRIPTION OF THE INVENTION

The present invention relates to a moisture-curable resin composition comprising: (a) at least one moisture-curable polymer having at least one hydrolysable silyl group; (b) at least one hydrocarbylalkoxysilane; and (c) at least one silane adhesion promoter containing a glycidoxy group, wherein
(i) the amount of said component (b) present in the moisture-curable resin composition is from about 5 to about 35 weight percent based upon the weight of said component (a);
(ii) the amount of said component (c) present in the moisture-curable resin composition is from about 1 to about 25 weight percent based upon the weight of said component (a);
(iii) the total amount of said component (b) and said component (c) present in the moisture-curable resin composition is from about 10 to about 45 weight percent based upon the weight of said component (a);

with the provisos that
(i) the moisture-curable resin composition is substantially free of hydroxyl-terminated dimethyl siloxane; and
(ii) the moisture-curable resin composition is substantially free of low molecular weight glycols.

In an embodiment, moisture-curable polymer (a) has the general Formula (I):

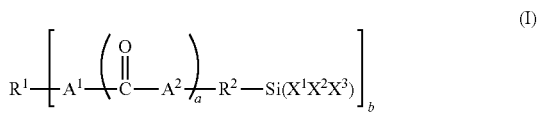

wherein:

$R^1$ is independently a monovalent or polyvalent organic polymer fragment having a number average molecular weight of from 500 to 25,000 grams per mole (g/mol);

each occurrence of $R^2$ is independently a divalent hydrocarbylene group containing from 1 to 12 carbon atoms;

each occurrence of $A^1$ is independently selected from divalent oxygen (—O—), sulfur (—S—) or substituted nitrogen of the structure $(-)_2NR^3$, wherein $R^3$ is hydrogen, alkyl, alkenyl, arenyl, aryl, aralkyl, alkyl containing at least one ester functional group or —$R^2SiX^1X^2X^3$ group, wherein each $R^3$, other than hydrogen, contains from 1 to 18 carbon atoms, and with the provisos that when $A^1$ is oxygen or sulfur, then $A^2$ is $(-)_2NR^3$ and when a is 0, then $A^1$ is oxygen;

each occurrence of $A^2$ is independently selected from divalent oxygen (—O—), sulfur (—S—) or substituted nitrogen of the structure $(-)_2NR^3$, wherein $R^3$ is hydrogen, alkyl, alkenyl, arenyl, aryl, aralkyl, alkyl containing at least one ester functional group or —$R^2SiX^1X^2X^3$ group, wherein each $R^3$, other than hydrogen, contains from 1 to 18 carbon atoms, and with the proviso that when $A^2$ is oxygen or sulfur, then $A^1$ is $(-)_2NR^3$;

each occurrence of $X^1$ is independently $R^4O$—, wherein each $R^4$ is independently selected from the group consisting of hydrogen, alkyl, alkenyl, arenyl, aryl, and aralkyl groups, wherein each $R^4$, other than hydrogen, contains from 1 to 18 carbon atoms and, optionally, contains at least one oxygen or sulfur atom;

each occurrence of $X^2$ and $X^3$ is independently selected from the group consisting of $R^4O$— and $R^5$ wherein each $R^4$ is independently selected from the group consisting of hydrogen, alkyl, alkenyl, arenyl, aryl, and aralkyl, wherein each $R^4$, other than hydrogen, contains from 1 to 18 carbon atoms and, optionally, contains at least one oxygen or sulfur atom and each $R^5$ is independently an alkyl group containing from 1 to 6 carbon atoms; and, each occurrence of subscripts a and b is independently an integer wherein a is 0 or 1 and b is 1 to 6.

The hydrocarbylalkoxysilane (b) of the present invention is a compound of the general Formula (II):

   Formula (II)

wherein c is 0 or 1, and $R^6$ is an alkyl or an alkenyl group of 2 to 18 carbon atoms;

The silane adhesion promoter (c) of the present invention is a compound of the general Formula (III):

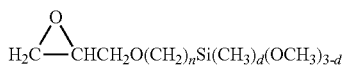

Formula (III)

wherein d is 0, 1 or 2, and n is 2 to 6;

The resin composition is stable under moisture free conditions. Upon application and in the presence of moisture, the moisture-curable polymer (a) and hydrocarbylalkoxysilane (b) and silane adhesion promoter (c) hydrolyzes and reacts with themselves and with each other to provide a cured elastomer having adhesion to concrete that can withstand the presence of liquid water that often in present in the environment.

As used herein, "alkyl" includes straight, branched and cyclic alkyl groups; "alkenyl" includes any straight, branched, or cyclic alkenyl group containing one or more carbon-carbon double bonds, where the point of substitution can be either at a carbon-carbon double bond or elsewhere in the group; "aryl" includes any aromatic hydrocarbon from which one hydrogen atom has been removed; "aralkyl" includes, but is not limited to, any of the aforementioned alkyl groups in which one or more hydrogen atoms have been substituted by the same number of like and/or different aryl (as defined herein) substituents; and "arenyl" includes any of the aforementioned aryl groups in which one or more hydrogen atoms have been substituted by the same number of like and/or different alkyl (as defined herein) substituents.

Specific examples of alkyls include, but are not limited to, methyl, ethyl, propyl, isobutyl, cyclohexyl and 2-cyclohexylethyl. Specific examples of alkenyls include, but are not limited to, vinyl, propenyl, allyl, and methallyl. Specific examples of aryls include, but are not limited to, phenyl and naphthalenyl. Specific examples of aralkyls include, but are not limited to, benzyl and phenethyl. Specific examples of arenyls include, but are not limited to, tolyl and xylyl.

As used herein, the phrase, "the amount of said component (b) present in the moisture-curable resin composition is from about 5 to about 35 weight percent based upon the weight of said component (a)" is understood to mean that the weights of each hydrocarbylalkoxysilane (b) that is present in the moisture-curable resin composition are added together to form a sum representing the total weight of all the hydrocarbylalkoxysilanes (b) that are present, the weights of each moisture-curable polymer containing at least one hydrolysable group (a) that is present in the moisture-curable resin composition are added together to form a sum representing the total weight of all the moisture-curable polymers containing at least one hydrolysable group (a) that are present, and the amount is calculated by dividing the sum representing the total weight of all the hydrocarbylalkoxysilanes (b) by the sum representing the total weight of all the moisture-curable polymers (a) and multiplying this quotient by 100 percent to give a value of from about 5 to about 35 weight percent.

As used herein, the phrase, "the amount of said component (c) present in the moisture-curable resin composition is from about 1 to about 25 weight percent based upon the weight of said component (a)" is understood to mean that the weights of each silane adhesion promoter (c) that is present in the moisture-curable resin composition are added together to form a sum representing the total weight of all the silane adhesion promoter (c) that are present, the weights of each moisture-curable polymer containing at least one hydrolysable group (a) that is present in the moisture-curable resin composition are added together to form a sum representing the total weight of all the moisture-curable polymers containing at least one hydrolysable group (a) that are present, and the amount is calculated by dividing the sum representing the total weight of all the silane adhesion promoters (c) by the sum representing the total weight of all the moisture-curable polymers (a) and multiplying this quotient by 100 percent to give a value of from about 1 to about 25 weight percent.

As used herein, the phrase, "the total amount of said component (b) and said component (c) present in the moisture-curable resin composition is from about 10 to about 45 weight percent based upon the weight of said component (a)" is understood to mean that the weights of each hydrocarbylalkoxysilane (b) and the weights of each silane adhesion promoter (c) that are present in the moisture-curable resin composition are added together to form a sum representing the total weight of all the hydrocarbylalkoxysilanes (b) and silane adhesion promoters (c) that are present, the weights of each moisture-curable polymer containing at least one hydrolysable group (a) that are present in the moisture-curable resin composition are added together to form a sum representing the total weight of all the moisture-curable polymers containing at least one hydrolysable group (a) that are present, and the amount is calculated by dividing the sum representing the total weight of all the hydrocarbylalkoxysilane (b) and silane adhesion promoters (c) by the sum representing the total weight of all the moisture-curable polymers (a) and multiplying this quotient by 100 percent to give a value of from about 10 to about 45 weight percent.

Advantageously, in the moisture-curable resin composition of the invention, component (b) is present in an amount of from about 8 weight percent to about 30 weight percent, more advantageously from about 10 weight percent to about 26 weight percent, component (c) is present in an amount of from about 5 weight percent to about 20 weight percent, more advantageously from 8 weight percent to 14 weight percent, the total amount of components (b) and (c) is from about 15 weight percent to about 40 weight percent, more advantageously from 18 weight percent to about 38 weight percent, all percentages being weight percentage based on the weight of component (a).

In order to provide desirable high peel strengths and cohesive failure mode in unprimed concrete applications, advantageously, the moisture-curable resin composition is substantially free of hydroxyl-terminated dimethyl siloxane and low molecular weight glycols.

As used herein, "substantially free of hydroxyl-terminated dimethyl siloxane and low molecular weight glycols" is intended to mean that the moisture-curable resin composition of the present invention does not contain or contains less than 3 weight percent, advantageously less than 1 weight percent of hydroxyl-terminated dimethyl siloxane and low molecular weight glycols based on the total weight of the moisture-curable resin composition.

The hydroxyl-terminated dimethyl siloxane has the general Formula (IV):

wherein x is an integer of from 2 to 10,000.

The low molecular weight glycol has the general Formula (V):

wherein $R^7$ is hydrogen or an alkyl group of from 1 to 4 carbon atoms, m is an integer of from 2 to 6 and y is an integer from 1 to 4.

In one embodiment, the moisture-curable resin composition of the invention is substantially free of, i.e., does not contain or contains less than 3 weight percent, advantageously less than 1 weight percent of an amino-functional alkoxysilane of Formula (VI), based on the total weight of the moisture-curable resin composition:

$$Y^1 - R^8SiR^9{}_f(OR^{10})_{3-f} \quad \text{(VI)}$$

wherein:

each occurrence of $R^8$ is a divalent hydrocarbylene group containing from 1 to 12 carbon atoms;

each occurrence of $R^9$ is monovalent hydrocarbon containing from 1 to 6 carbon atoms;

each occurrence of $R^{10}$ is monovalent hydrocarbon containing from 1 to 6 carbon atoms;

$Y^1$ is an amino-functional group selected from the group consisting of $(R^{11})_2N-$, and $(R^{11})_2NR^{12}NR^{11}-$, wherein $R^{11}$ is hydrogen, a monovalent hydrocarbon of from 1 to 12 carbon atoms or a $-R^8SiR^9{}_f(OR^{10})_{3-f}$ group;

$R^{12}$ is an alkylene group of from 2 to 6 carbon atoms; and each occurrence of the subscript f is independently an integer of from 0 to 2.

Moisture-Curable Polymer (a).

The moisture-curable polymer (a), which includes, but is not limited to (1) isocyanatosilane-terminated polyurethane polymers as described in U.S. Pat. No. 5,990,257 and U.S. Pat. No. 7,319,128, which are incorporated herein by reference in their entireties; (2) aminosilane-terminated polyurethane prepolymers as described in U.S. Pat. No. 6,197,912 and U.S. Pat. No. 6,001,946, which are incorporated herein by reference in their entireties; and (3) the hydrolysable silane-terminated polyethers as described in U.S. Patent Application No. 2006/0173121, which is incorporated herein by reference in its entirety Advantageously, moisture-curable polymer (a) is provided by Formula (I) wherein $R^1$ is a polymer fragment having a number average molecular weight from 500 to 25,000 grams per mole, advantageously from 1,000 to 20,000 grams per mole and more advantageously from 4,000 to 12,000 grams per mole. The number average molecular weight is determined using Gel Permeation Chromatography (GPC) and polystyrene standards at room temperature. The flexibility of the cured moisture curable polymer (a) is improved when the Tg is advantageously from –20° C. to –80° C., more advantageously from –25° C. to –60° C., and most advantageously from –30° C. to –55° C. The glass transition temperature is determined using Differential Scanning calorimetry (DSC) method. $R^2$ is advantageously an alkylene of from 1 to 6 carbon atoms, more advantageously from 1 to 3 carbon atoms and most advantageously 3 carbon atoms; $A^1$ is advantageously oxygen or substituted nitrogen of the structure $(-)_2NR^3$, wherein $R^3$ is hydrogen, alkyl or aryl, wherein each $R^3$, other than hydrogen, contains 1 to 10 carbon atoms and advantageously, 1 to 6 carbon atoms; $A^2$ is substituted nitrogen of the structure $(-)_2NR^3$, wherein $R^3$ is advantageously hydrogen, alkyl or aryl, wherein each $R^3$, other than hydrogen, contains 1 to 10 carbon atoms and more advantageously, 1 to 6 carbon atoms; $X^1$ and $X^2$ are methoxy, ethoxy or propoxy; and $X^3$ is methyl, methoxy, ethoxy or propoxy.

In one embodiment, moisture-curable polymer (a) is represented by general Formula (VII):

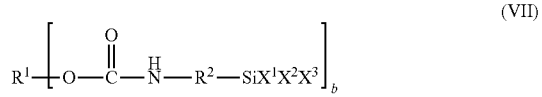

wherein $R^1$, $R^2$, $X^1$, $X^2$, $X^3$ and b are as defined above in connection with Formula (I).

Advantageously, $R^1$ is an organic polymer fragment contains at least a urethane group as a result of the reaction of a polyol with an isocyanate group, and has a number average molecular weight of 4,000 to 18,000 grams per mole. More advantageously, $R^1$ is a polyurethane moiety derived from the reaction of a polyol and a diisocyanate. Advantageously $R^2$ is methylene or propylene; $X^1$ and $X^2$ are methoxy; $X^3$ is methyl or methoxy, and b is 2.

In one embodiment, moisture-curable polymer (a) of Formula (VII) is a silylated polyurethane prepared by a process comprising: (A) reacting a polyol component with a diisocyanate component at a stoichiometric excess of the polyol component to the diisocyanate component to form a hydroxyl-terminated polyurethane; and (B) reacting the hydroxyl-terminated polyurethane with one or more isocyanate silanes of the formula $OCN-R^2-SiX^1X^2X^3$, wherein $R^2$, $X^1$, $X^2$ and $X^3$ are as defined above in connection with Formula (I).

In another embodiment, moisture-curable polymer (a) of Formula (VII) is a silylated polyurethane prepared by a process comprising reacting a polyol component with one or more isocyanate silanes of the formula $OCN-R^2-SiX^1X^2X^3$, wherein $R^2$, $X^1$, $X^2$ and $X^3$ are as defined above in connection with Formula (I), and wherein the molar ratio of —NCO of the isocyanate silane to —OH of the polyol component is advantageously from 0.3 to 1.1, more advantageously from 0.5 to 1, and most advantageously from 0.95 to 0.99.

Representative non-limiting examples of polyols include hydroxyl-terminated polyalkylene oxides, such as hydroxyl-terminated polypropylene oxide, hydroxyl-terminated polyethylene oxide, and hydroxyl-terminated polybutylene oxide. In a preferred embodiment, the polyol is polypropylene glycol.

Suitable diisocyanate includes but are not limited to 2,4-toluene diisocyanate, 2,6-toluene diisocyanate, a mixture of 2,4- and 2,6-toluene diisocyanate isomers, 4,4' diphenylmethanediisocyanate, isophorone diisocyanate, dicyclohexylmethane-4,4'-diisocyanate, various liquid diphenylmethanediisocyanates containing a mixture of 2,4- and 4,4' isomers, and the like, and mixtures thereof. Advantageously, the isocyanate functional monomer employed is an isophorone diisocyanate (IPDI) available from Bayer under the trade name Desmodur I or tetramethylxylylene diisocyanate (TMXDI).

The moisture-curable polymer (a) represented by Formula (I) can be prepared from a polyol reactant or a combination of polyol reactants. Combinations or mixtures of polyol reactants are often used to achieve specific physical properties of the moisture-cured polymer resin, such as flowability, tensile, modulus and adhesion. The number average molecular weight of the polyol reactant is advantageously from 300 to 24,000 grams per mole (g/mol), and more advantageously from 1,000 to 20,000 grams per mole. These polyols optionally contain other organic functional groups, including the non-limiting examples of urethane, thiourethane, urea, biuret, ester, thioester, ether, thioether, amide, and the like.

A moisture-curable polymer containing one silyl group can be used in combination with a moisture-curable polymer containing two or more silyl groups to lower the Tg and increase the flexibility of the moisture-curable polymer (a). The moisture-curable polymer containing one silyl group functions as a reactive plasticizer that becomes incorporated into the polymer network during cure. However, if the average hydroxyl-functionality polyol mixture is too low, then the moisture-curable silylated polymer resin composition may cure poorly. It is, therefore, preferable to have sufficient average functionality in the reactant polyols, such that the moisture-curable polymer (a) prepared from them cures on exposure to moisture. The average hydroxyl-functionality of the polyol reactant mixture is advantageously from 1.6 to 6.0 hydroxyl group per polyol molecule, more advantageously from 1.8 to 3.0 hydroxyl group per polyol molecule and most advantageously, from 1.95 to 2.5 hydroxyl groups per polyol molecule.

The moisture-curable polymer (a) can be prepared from a blend of a low number average molecular weight polyol reactant and a high number average molecular weight polyol reactant. The moisture-curable polymer (a) prepared from this blend of polyol reactants after cure and at low strains has a high modulus, while maintaining high values for elongations at break. The number average molecular weight of the low molecular weight polyol is advantageously from 300 to 2,000 grams per mole, more advantageously from 500 to 1,200 grams per mole and most advantageously from 800 to 1,000 grams per mole. The number average molecular weight of the high molecular weight polyol is advantageously from 2,001 to 24,000 grams per mole, more advantageously from 4,000 to 12,000 grams per mole and most advantageously from 8,000 to 10,000 grams per mole. The weight ratio of low molecular weight polyol reactant to high molecular weight polyol reactant is advantageously from 0.01 to 3, more advantageously from 0.05 to 1 and most advantageously from 0.2 to 0.5.

Representative non-limiting examples of polyols include hydroxyl-terminated polyalkylene oxides, such as hydroxyl-terminated polypropylene oxide, hydroxyl-terminated polyethylene oxide, and hydroxyl-terminated polybutylene oxide; polyoxyalkylene triols; polycaprolactone diols and triols; hydroxyl terminated unsaturated rubbers, such as hydroxyl-terminated polybutane diene copolymer; polyester diols and polyol made from saturated aliphatic diacids and diols or triols, unsaturated diacids and diols or triols, saturated polyacids and diols or aromatic diacids and diols or triols and the like; polytetramethylene glycols; and other diols or triols.

The polyols employed may have a very low unsaturation level and therefore high functionality. Said polyols are typically prepared using metal complex catalysts for the polymerization of alkylene oxide resulting in polyols having a low level of terminal ethylenic unsaturation. The polyols have a terminal ethylenic unsaturation that is advantageously less than 0.4 milliequivalents per gram (meq/g) of polyol, more advantageously less than 0.1 milliequivalents per gram of polyol and even more advantageously, less than 0.02 milliequivalents per gram of polyol. The number average molecular weight of the polyols is advantageously in the range between from 500 and 24,000 grams per mole and more advantageously from 2000 to 12,000 grams per mole.

The moisture-curable polymer (a) of the present invention can be prepared by any of several synthetic methods including those hereinafter described.

Synthetic Method 1: Reaction of a Polyol with a Polyisocyanate and then with a Hydrolysable Silane Containing Active Hydrogen-Functional Group to Provide a Moisture-Curable Polymer Containing at Least One Hydrolysable Silyl Group The above-mentioned hydroxyl-functional polyols are converted into isocyanate-terminated prepolymers in known manner by reaction with polyisocyanates. These prepolymers are prepared by reacting an excess of polyisocyanate with a polyol or a combination of polyols usually in the presence of a catalyst.

The isocyanate-terminated prepolymer after the reaction of the polyol with the polyisocyanate has the general Formula (VIII):

$$R^1(-N=C=O)_b \tag{VIII}$$

wherein $R^1$ and b have the aforestated meanings as set forth for Formula (I). It is understood that the $R^1$ organic polymer fragment contains a urethane group as a result of the reaction of the polyol with an isocyanate group. According to one embodiment of the invention, isocyanate-terminated prepolymer is prepared by reacting diisocyanates with polyols at different molar ratios of NCO to OH that range advantageously from 1.1 to 2.0, more advantageously from 1.4 to 1.9 and most advantageously from 1.5 to 1.8.

Suitable polyisocyanates include any from which polyurethane polymers can be prepared by the customary sequence of reaction with polyol to form a prepolymer. Useful diisocyanates include, for example, 2,4-toluene diisocyanate, 2,6-toluene diisocyanate, a mixture of 2,4- and 2,6-toluene diisocyanate isomers, 4,4' diphenyl-methanediisocyanate, isophorone diisocyanate, dicyclohexylmethane-4,4'-diisocyanate, various liquid diphenylmethane-diisocyanates containing a mixture of 2,4- and 4,4' isomers, and the like, and mixtures thereof. Advantageously, the isocyanate functional monomer employed is an isophorone diisocyanate (IPDI) available from Bayer under the trade name Desmodur I or tetramethylxylylene diisocyanate (TMXDI).

A catalyst may be used in the preparation of the above-mentioned isocyanate-terminated prepolymers. Suitable catalysts are metal salts or bases, and include the non-limiting examples of bismuth salts, such as bismuth trisneodecanoate and other bismuth carboxylates; zirconium compounds or aluminum compounds, such as zirconium chelates and aluminum chelates; dialkyltin dicarboxylates, such as dibutyltin dilaurate and dibutyltin acetate; dialkyltin oxides, such as dibutyltin oxide; tertiary amines; the stannous salts of carboxylic acids, such as stannous octoate and stannous acetate, and the like.

In a second process step, the isocyanate-terminated prepolymer of general Formula (VIII) is reacted with silane(s) that contain an active hydrogen functional group to prepare moisture-curable polymer (a). The silanes that contain an active hydrogen-functional group are provided by the general Formula (IX):

$$HA^2R^2-SiX^1X^2X^3 \tag{IX}$$

wherein $R^2$ is independently a divalent hydrocarbylene group containing from 1 to 12 carbon atoms; each occurrence of $A^2$ is independently selected from the group consisting of oxygen (—O—), sulfur (—S—), $(-)_2NR^3$, wherein $R^3$ is hydrogen, alkyl, alkenyl, arenyl, aralkyl, alkyl containing at least one ester functional group or —$R^2SiX^1X^2X^3$ group, wherein each $R^3$, other than hydrogen, contains from 1 to 18 carbon atoms; and $X^1$, $X^2$ and $X^3$ have the aforestated meanings as set forth for Formula (I).

The silane terminating reactions of the present invention can be any kind as known in the art, e.g., those reactions disclosed in U.S. Pat. No. 6,197,912 and U.S. Pat. No. 5,990,257, the entire contents of which are incorporated herein by reference.

The active hydrogen organofunctional silanes include, e.g., primary and secondary amino-alkoxysilanes, and mercaptoalkoxysilanes. Representative examples of suitable aminosilanes include, but are not limited to, N-phenyl-aminomethyltrimethoxysilane, N-cyclohexyl-aminomethyltrimethoxysilane, aminomethyltrimethoxysilane, N-phenyl-3-aminopropyltrimethoxysilane, N-methyl-3-aminopropyltrimethoxysilane, N-butyl-3-aminopropyltrimethoxysilane, 4-amino-3,3-dimethylbutyltrimethoxysilane, N-cyclohexyl-3-aminopropyltrimethoxysilane, dibutyl maleate adduct of 3-aminopropyltrimethoxysilane, dibutyl maleate adduct of 4-amino-3,3-dimethylbutyltrimethoxysilane, 3-aminopropyltriethoxysilane, bis-(3-trimethoxysilylpropyl)amine, 3-aminopropylmethyldimethoxysilane, N-methyl-3-amino-2-methylpropyltrimethoxysilane, N-ethyl-3-amino-2-methylpropyltrimethoxysilane, N-ethyl-3-amino-2-methylpropyldiethoxymethylsilane, N-ethyl-3-amino-2-methylpropyltriethoxysilane, N-ethyl-3-amino-2-methylpropylmethyldimethoxysilane, N-butyl-3-amino-2-methylpropyltrimethoxysilane, 3-(N-methyl-2-amino-1-methyl-1-ethoxy)propyltrimethoxysilane, N-ethyl-4-amino-3,3-dimethylbutyldimethoxymethylsilane, N-ethyl-4-amino-3,3-dimethylbutyltrimethoxysilane, bis-(3-trimethoxysilyl-2-methylpropyl)amine, N-(3'-trimethoxysilylpropyl)-3-amino-2-methylpropyltrimethoxysilane, 3-aminopropyldimethylmethoxysilane and mixtures thereof. Representative examples of suitable mercaptosilanes include, but are not limited to, 3-mercaptopropyltrimethoxysilane, 3-mercaptopropyltriethoxysilane, 3-mercaptopropylmethyldimethoxysilane, 3-mercaptopropyldimethylmethoxysilane, mercaptomethyltrimethoxysilane, mercaptmethylmethyldimethoxysilane and mixtures thereof.

Advantageously, the silanes containing an active hydrogen-functional group, as represented by the general Formula (IX), contain an $X^1$ and $X^2$ that is methoxy and an $X^3$ group that is methyl or methoxy. The methoxysilyl groups are more reactive with water (moisture) and results in faster hydrolysis of the alkoxysilyl group. The faster hydrolysis results in a faster cure of the moisture-curable polymer (a) after application and exposure to moisture.

Synthetic Method 2: Reaction of a Polyol or Hydroxyl-Terminated Polyurethane with a Hydrolysable Silane Containing an Isocyanate-Functional Group to Provide a Moisture-Curable Polymer Containing at Least One Hydrolysable Silyl Group.

The above-mentioned hydroxyl-functional polyols or hydroxyl-terminated polyurethanes are converted into moisture-curable polymer (a) in known manner by reaction with an isocyanate-functional silane. The moisture-curable polymer (a) is prepared by reacting a polyol or a combination of polyols or a hydroxyl-terminated polyurethane usually in the presence of a catalyst with less than an equivalent to slightly more than an equivalent of hydrolysable silane containing an isocyanate group. The molar ratio of —NCO of the hydrolysable silane containing an isocyanate group to —OH is advantageously from 0.3 to 1.2, more advantageously from 0.5 to 1.1, and most advantageously from 0.95 to 0.99. When the ratio of —NCO to —OH is less than 1, the moisture-curable polymer (a) has residual hydroxyl groups, which may be advantageous to improve adhesion to substrates.

Suitable hydrolysable silanes containing an isocyanate-functional group for use in preparing components (a), of the present invention, have the general Formula (X):

$$OCN—R^2—SiX^1X^2X^3 \quad (X)$$

wherein $R^2$ and $X^1$, $X^2$ and $X^3$ have the aforestated meanings as set forth for Formula (I).

Representative hydrolysable silanes containing an isocyanate-functional group, as represented by general Formula (X), that are suitable for use herein include, but not limited to, isocyanatomethyltrimethoxysilane, isocyanatomethylmethydimethoxysilane, 3-isocyanatopropyltrimethoxysilane, 3-isocyanatoisopropyltrimethoxysilane, 4-isocyanatobutyltrimethoxysilane, 2-isocyanato-1,1-dimethylethyltrimethoxysilane, 3-isocyanatopropyltriethoxysilane, 3-isocyanatoisopropyltriethoxysilane, 4-isocyanatobutyltriethoxysilane, 2-isocyanato-1,1-dimethylethyltriethoxysilane, 3-isocyanatopropylmethyldimethoxysilane, 3-isocyanatoisopropyldimethylmethoxysilane, 4-isocyanatobutylphenyldimethoxysilane, 2-(4-isocyanatophenyl)ethylmethyldimethoxysilane and mixtures thereof.

Advantageously, the hydrolysable silanes containing an isocyanato-functional group, as represented by the general Formula (X), contain an $X^1$ and $X^2$ that is methoxy and an $X^3$ group that is methyl or methoxy. The methoxysilyl groups are more reactive with water (moisture) and results in faster hydrolysis of the alkoxysilyl group. The faster hydrolysis results in a faster cure of the moisture-curable polymer (a) after application and exposure to moisture.

Method 3: Reaction of Polyols with Ethylenically Unsaturated Halo-Compounds and then Silanes Containing an Si—H Group to Provide a Moisture-Curable Polymer Containing at Least One Hydrolysable Silyl Group.

The above-mentioned hydroxyl-functional polyols are converted into ethylenically unsaturated prepolymers in known manner by reaction with ethylenically unsaturated halo compounds. These prepolymers are prepared by reacting ethylenically unsaturated halo compounds with a polyol or a combination of polyols usually in the presence of a catalyst.

The ethylenically unsaturated halo compounds useful in the preparation of the ethylenically unsaturated polymers are provided by general Formula (XI):

$$Y^1R^{13}C(R^{14})=CH_2 \quad (XI)$$

wherein $R^{13}$ is a divalent hydrocarbylene group containing from 1 to 10 carbon atoms selected from the group consisting of divalent alkylene, alkenylene, arenylene, arylene and aralkylene, and, optionally, contains at least one heteroatom selected from the group consisting of oxygen and sulfur; $R^{14}$ is a hydrogen or an alkyl group of from 1 to 6 carbon atoms; and each $Y^1$ is independently a halogen atom, selected from the group consisting of Cl—, Br— and I—. The reaction conditions are well known in the art, as for example U.S. Pat. Nos. 3,951,888 and 3,971,751, the entire content of which are incorporated herein by reference.

Representative non-limiting examples of ethylenically unsaturated halogen compounds, as represented by general Formula (XI), include allyl chloride, allyl bromide, allyl iodide, methallyl chloride, methallyl bromide, 6-chlorohexene, chloromethylstyrene, and mixtures thereof.

In the final step, the ethylenically unsaturated prepolymer is hydrosilated with hydrolysable hydridosilane of Formula (XII):

$$HSiX^1X^2X^3 \quad (XII)$$

wherein $X^1$, $X^2$ and $X^3$ have the aforestated meanings as set forth for Formula (I). The conditions for hydrosilation of intermediates containing carbon-carbon double bonds is well known in the art, such as described in "Comprehensive Handbook of Hydrosilylation," B. Marciniec (ed), Pergamon Press, New York (1992), which is included in its entirety herein by reference.

Useful hydrolysable hydridosilanes include, but are not limited to, H—Si(OCH$_3$)$_3$, H—Si(OCH$_2$CH$_3$)$_3$, H—SiCH$_3$(OCH$_3$)$_3$, H—SiCH$_3$(OCH$_2$CH$_3$)$_2$, H—Si(CH$_3$)$_2$OCH$_3$, H—Si(CH$_3$)$_2$OCH$_2$CH$_3$, and mixtures thereof.

Advantageously, the hydrosilanes, as represented of the general Formula (X), contain an $X^1$ and $X^2$ that is methoxy and an $X^3$ group that is methyl or methoxy. The methoxysilyl groups are more reactive with water (moisture) and results in faster hydrolysis of the alkoxysilyl group. The faster hydrolysis results in a faster cure of the moisture-curable polymer (a) after application and exposure to moisture.
Hydrocarbylalkoxysilane (b).

As used herein, the term, "hydrocarbylalkoxysilane" refers to a compound containing a hydrolysable alkoxysilyl group and a hydrocarbyl group that, when combined with a moisture-curable polymer having at least one hydrolysable silyl group improves the adhesion of the cured moisture-curable rein composition to unprimed concrete.

Although not meant to be bound by any theory, it is believed that the hydrocarbylalkoxysilane (b) migrates (absorbs) into the concrete substrate, where it reacts with ambient moisture to hydrolyses and condenses the hydrocarbylalkoxysilane (b) and forms an interpenetrating siloxane network within the concrete, thereby creating a hydrophobic barrier that prevents liquid water from migrating through the concrete and attacking the bonds between the moisture-curable polymer (a) and the concrete and/or siloxane film formed from the hydrolysis and condensation of the hydrocarbylalkoxysilane (b).

The hydrocarbylalkoxysilane (b) of the present invention is a compound of the general Formula (II):

Formula (II)

wherein c is 0 or 1, and $R^6$ is an alkyl or an alkenyl group of 2 to 18 carbon atoms.

In connection with the hydrocarbylalkoxysilane (b) of Formula (II), $R^6$ is a monovalent $C_2$-$C_{18}$ hydrocarbon group that includes straight chain alkyl, branched chain alkyl, cyclic alkyl, and alkenyl, groups. It is preferable that the alkyl group contains from 4 to 16 carbon atoms, and more preferable from 6 to 14 carbons because the higher carbon number of the alkyl group prevents evaporation during application, contributes to a more hydrophobic nature of the hydrocarbylalkoxysilane (b) and reduces the viscosity of the moisture-curable resin composition.

Representative and non-limiting examples of straight chain alkyl groups include methyl, ethyl, propyl, butyl, pentyl, hexyl, heptyl, octyl, decyl, dodecyl, heptadecyl and octadecyl. Specific and non-limiting examples of branched chain alkyl groups include isopropyl, isobutyl, isopentyl, neopentyl, isohexyl, neohexyl, isooctyl, neooctyl, isodecyl, isoheptadecyl and isooctadecyl and the like. Representative and non-limiting examples of cyclic alkyl groups include cyclopentyl, cyclohexyl, cycloheptyl, cyclooctyl, cyclooctatrienyl, cyclododocyl and the like.

Representative, non-limiting examples of the hydrocarbylalkoxysilanes (b) include, but are not limited to, butyl-trimethoxy-silane, sec-butyl-trimethoxy-silane, hexyl-trimethoxy-silane, hexyl-dimethoxy-methyl-silane, hex-5-enyl-trimethoxy-silane, hex-5-enyl-dimethoxy-methyl-silane, trimethoxy-octyl-silane, dimethoxy-methyl-octyl-silane, decyl-trimethoxy-silane, decyl-dimethoxy-methyl-silane, dodecyl-trimethoxy-silane, dodecyl-dimethoxy-methyl-silane, hexadecyl-trimethoxy-silane, hexadecyl-dimethoxy-methyl-silane, octadecyl-trimethoxy-silane, dimethoxy-methyl-octadecyl-silane, dimethoxy-methyl-eicosyl-silane, trimethoxy-methyl-eicosyl-silane and combinations thereof.

More preferably, non-limiting examples hydrocarbylalkoxysilanes (b) include trimethoxy-octyl-silane, dimethoxy-methyl-octyl-silane, decyl-trimethoxy-silane, decyl-dimethoxy-methyl-silane, dodecyl-trimethoxy-silane, dodecyl-dimethoxy-methyl-silane, hexadecyl-trimethoxy-silane, hexadecyl-dimethoxy-methyl-silane, octadecyl-trimethoxy-silane and dimethoxy-methyl-octadecyl-silane.

Even more preferably, non-limiting examples hydrocarbylalkoxysilanes (b) include dodecyl-trimethoxy-silane, dodecyl-dimethoxy-methyl-silane, hexadecyl-trimethoxy-silane, hexadecyl-dimethoxy-methyl-silane, octadecyl-trimethoxy-silane and dimethoxy-methyl-octadecyl-silane.

Hydrocarbylalkoxysilanes (b) of the present invention may be prepared by various methods known in the art. In one method, the hydrocarbylalkoxysilanes (b) are prepared by reacting an alkene i.e. a hydrocarbon that contains a carbon-carbon double bond, with a hydrolysable hydridosilane of Formula (XIII):

(XIII)

wherein c is 0 or 1. The conditions for hydrosilation of intermediates containing carbon-carbon double bonds are well known in the art, such as described in "Comprehensive Handbook of Hydrosilylation," B. Marciniec (ed), Pergamon Press, New York (1992), which is included in its entirety herein by reference.

Silane Adhesion Promoter (c).

As used herein, the term, "silane adhesion promoter" refers to a compound containing a hydrolysable alkoxysilyl group and an organofunctional group that, when combined with a moisture-curable polymer having at least one hydrolysable silyl group improves the adhesion of the cured moisture-curable rein composition to unprimed concrete and other substrates, such as glass, plastics, metals, metal oxide and mineral surfaces.

The silane adhesion promoter (c) of the present invention is a compound of the general Formula (III):

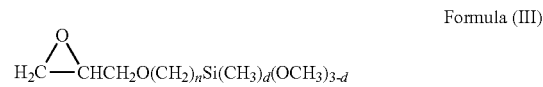
Formula (III)

wherein d is 0, 1, or 2, and n is from 2 to 6.

Preferred, non-limiting examples of the silane adhesion promoter (c) include trimethoxy-(3-oxiranylmethoxy-propyl)-silane and dimethoxy-methyl-(3-oxiranylmethoxy-propyl)-silane.

Additional Components.

In one embodiment, the moisture-curable composition of the invention additionally contains at least one component selected from the group consisting of a catalyst for catalyzing the reaction between the moisture-curable polymer having at least one hydrolysable silyl group (a) with water under curing conditions, a filler, a plasticizer, and combinations thereof.

The catalyst of the moisture-curable resin composition can be any catalyst that is effective in promoting the reaction between moisture-curable polymer (a), the hydrocarbylalkoxysilane (b) and silane adhesion promoter (c), which occurs upon exposure to moisture. Suitable cure catalysts include but not limited to organometallic catalysts, amine catalysts, and the like. Advantageously, the catalyst is selected from the group consisting of organic tin, zirconium complex, aluminum chelate, titanic chelate, organic zinc, organic cobalt, organic iron, organic nickel and organobismuth, and mixtures thereof. The catalyst can be a mixture of organometallic catalyst and amine catalyst.

Representative examples of catalysts include, but are not limited to, dibutyltin oxide, dimethyltin diacetate, dimethyltin dilaurate, dimethyltin dineodecanote, dibutyltin dilaurate, dioctyltin dilaurate, dibutyltin diacetate, stannous octoate, stannous acetate, stannous oxide, morpholine, tri-isopropylamine, bis-(2-dimethylaminoethyl)ether and piperazine.

Other useful catalysts include zirconium-contain, aluminum-containing and bismuth-contain complexes such as KAT XC6212, K-KAT 5218 and K-KAT 348, supplied by King Industries, Inc., titanium chelates such as the TYZOR® types, available from DuPont, the KR types, available from Kenrich Petrochemical, Inc., amines such as NIAX A-501 amine, available from Momentive Performance Materials Inc., and the like.

The catalyst may be present in the moisture-curable resin composition in an amount of from 0.05 weight percent to 10 weight percent based on the total weight of components (a), (b) and (c), advantageously in an amount of from 0.1 weight percent to 5 weight percent based on the total weight of components (a), (b) and (c) and most advantageously, in an amount of from 0.5 weight percent to 3 weight percent based on the total weight of components (a), (b) and (c).

The filler of the moisture-curable resin composition can be any inorganic or organic filler used to reinforce or extend the moisture-curable polymer (a) of the present invention. Typical fillers include, for example, reinforcing fillers such as carbon black, fumed silica, precipitated silica, clays, talc, aluminum silicates, and extending fillers such as treated and untreated calcium carbonates and the like.

The fillers may be present in the moisture-curable resin composition in an amount of from 1 weight percent to 400 weight percent based on the total weight of components (a), (b) and (c), advantageously in an amount of from 10 weight percent to 250 weight percent based on the total weight of components (a), (b) and (c) and most advantageously, in an amount of from 20 weight percent to 150 weight percent based on the total weight of components (a), (b) and (c).

The plasticizers of the moisture-curable resin composition can be any organic compound of that is added to the moisture-curable resin composition of the present invention can to modify the properties and to facilitate use of higher filler levels. Exemplary plasticizers include phthalates, diproplyene and diethylene glycol dibenzoates, alkylsulphonate phenols, alkyl phenathres, alkyl/diaryl phosphates and mixtures thereof and the like. Advantageously, the plasticizer has a viscosity of from 10 to 1000 mPa·s at 20° C. according to ASTM D 445-10, Standard Test Method for Kinematic Viscosity of Transparent and Opaque Liquids (and Calculation of Dynamic Viscosity).

The plasticizers may be present in the moisture-curable resin composition in an amount of from 1 weight percent to 200 weight percent based on the total weight of components (a), (b) and (c), advantageously in an amount of from 5 weight percent to 100 weight percent based on the total weight of components (a), (b) and (c) and most advantageously, in an amount of from 10 weight percent to 80 weight percent based on the total weight of components (a), (b) and (c).

The moisture-curable resin composition of the present invention can include various other components, including but not limited to, pigments, thixotropes, waxes, anti-sagging agents, stabilizers, viscosity modifiers, and the like. Various castor waxes, fumed silica, treated clays and polyamides typify thixotropic additives. Stabilizers can be incorporated into the moisture-curable resin composition of this invention include, for example, hindered amine, hindered phenol, and dialkylhydroxyamine.

When used in coating applications, the moisture-curable resin composition may contain organic solvents to lower the viscosity and assist in film formation. Typically, the amount of solvents used may vary from 1 to 20,000 weight percent, based upon the total weight of components (a), (b) and (c). Advantageously, the amounts of solvent are from 5 to 100 weight percent, more advantageously from 10 to 25 weight percent based upon the total weight of components (a), (b) and (c) to minimize the amount of volatile organic compounds that are released into the environment during application and drying.

In another aspect, the present invention also relates to cured compositions produced from curing the aforementioned moisture-curable resin compositions and to sealants, adhesives and coatings containing such cured compositions. The cured composition is produced by contacting a moisture-curable resin composition as defined above with water.

As used herein, the term "water" means atmospheric moisture, steam, liquid water, ice or water mixed with other organic compounds, such as organic solvents and is advantageously atmospheric moisture. The effective amount of water is that amount sufficient to react with the hydrolysable silyl groups and effect the cure of the composition. Typically, more than 0.5 mole of water is required per mole of the total of Si—$OR^4$ from the moisture curable polymer (a), and Si—$OCH_3$ from the hydrocarbylalkoxysilane (b) and adhesion promoter (c) that is present in the moisture-curable resin composition.

In still another aspect, the present invention also relates to an article comprising the cured compositions produced from curing the aforementioned moisture-curable resin compositions, whether these moisture-curable resin compositions are formulated into sealants, adhesives and coatings, which are bonded to an unprimed concrete. The article has good adhesion between the cured composition of the moisture-curable resin compositions and the unprimed concrete, which are able to survive exposure to liquid water for at least seven days at 20° C. When the article is subjected to a peel test, according to ASTM C-794-06, the article has a minimum of at least 20 percent cohesive failure after exposure to water for seven days and peel strengths of from 1.80 to 8.90 N/mm (10 to 50 lb/in).

The following examples are intended to illustrate, but in no way limit the scope of the present invention. All parts and percentages are by weight and all temperatures are in degrees Celsius unless explicitly stated otherwise.

EXAMPLES

Example 1

Preparation of Trimethoxysilyl-Terminated Polyurethane Polymer, Moisture Curable Polymer (a)

Into a four-neck reaction kettle was charged polypropylene glycol (1000 grams, 0.09 mole, weight average molecular weight of 12,000 grams per mole from Bayer under the trade name Acclaim 12200 diol). The polyol was stirred and sparged with nitrogen gas at 60° C. for 16 hours. The temperature of the polyol was cooled to 45° C. and then isophorone diisocyanate (9.99 grams, 0.0495 mole from Bayer) and tin catalyst (dibutyltin dilaurate, 7.5 ppm Sn, from Chemtura under the trade name Fomrez SUL-4) were added. After the exothermal had ceased, the reaction mixture was heated to 75° C. and maintained at this temperature with stirring and under a nitrogen gas blanket. The isocyanate content was checked every half hour using an n-butylamine titration method. When the isocyanate content was no longer detectable, 3-isocyanatopropyltrimethoxysilane (18.45 grams, 0.09 mole from Momentive Performance Materials Inc.) was added and the reaction mixture was stirred at 75° C. until the isocyanate content was no longer detectable. The viscosity was approximately 60 Pa·s at 25° C.

Examples 2-15 and Comparative Examples A and B

Preparation of a Series of One-Part, Moisture-Curable Silylated Polyurethane-Based Sealant Compositions, Curing and Mechanical Properties of the Cured Compositions A series of one-part, moisture-curable silylated polyurethane-based sealants was prepared according to the following procedure. Into a Ross Mixer, Model No. PDM-½ gallon, sold by Charles Ross & Sons Company were charged the trimethoxysilyl-terminated polyurethane polymer prepared in Example 1, vinyl trimethoxysilane desiccant, hydrocarbylene silane (b), adhesion promoter (c), di-isododecyl phthalate plasticizer, and antioxidants. The mixture was stirred for 15 minutes under nitrogen atmosphere. The calcium carbonate filler(s), the thixotrope, and rutile titanium dioxide pigment were added to the mixer with stirring. After the ingredients were added, the temperature was raised to 100° C.; the mixing chamber was evacuated under full vacuum; and the mixture was stirred for 1.5 hours. The mixer was cooled to 30° C.; the mixing chamber was purged with nitrogen gas; and an additional amount of vinyltrimethoxysilane discuant, catalysts and any other additives were added and mixed for 15 minutes under moderate vacuum. The chemical identity and amounts of each component in grams are presented in Table I.

Films of the sealant were cured in a humidity chamber, which was controlled at 23° C. and 50% relative humidity for seven days. The tensile strength and elongation were tested according to ASTM D412 test method and the hardness according to ASTM C661 test method.

The peel test specimens on concrete slabs (Portland cement) were prepared and tested according to ASTM C-794-06 test method. The concrete slabs were stored in saturated limewater. Prior to the preparation of the peel test specimens, the surface of the concrete was wet ground to remove any laitance, rinsed thoroughly under running tap water and dried overnight at 105 to 110° C. The concrete slabs were then vigorously brushed with a stiff bristle brush to remove any film or powder, and then conditioned in a humidity chamber at 25° C. and 50% relative humidity for at least one day but not longer than seven days. The test specimens were prepared according to the ASTM C-794-06 test method, and then cured in a humidity chamber according to the following conditions: seven days at 25° C. and 50% relative humidity; seven days at 38° C. and 90-95% relative humidity; and seven days at 25° C. and 50% relative humidity. The peel test specimens were then submerged in water for seven days at room temperature. The peel specimens were removed from the water, dried with a paper towel, and then immediately tested. The results are presented in Table I.

TABLE I

The formulation of a composition of the present invention and the physical properties of cured composition.

| | Ex. 2 | Ex. 3 | Ex. 4 | Ex. 5 | Ex. 6 | Ex. 7 | Ex. 8 |
|---|---|---|---|---|---|---|---|
| FORMULATION | | | | | | | |
| moisture-curable polymer (a)[1] | 37.00 | 37.00 | 33.52 | 37.1 | 37.1 | 37.1 | 52.33 |
| hydrocarbylalkoxysilane (b)[2] | 3.71 | 4.17 | 7.84 | 3.69 | 3.69 | 3.69 | |
| hydrocarbylalkoxysilane (b)[3] | | | | | | | 6.12 |
| hydrocarbylalkoxysilane (b)[4] | | | | | | | |
| adhesion promoter (c)[5] | 4.17 | 4.17 | 3.76 | 4.16 | 4.62 | 5.08 | 6.12 |
| desiccant[6] | 1.96 | 1.96 | 1.77 | 2.09 | 2.09 | 2.09 | 3.05 |
| filler[7] | | | | | | | |
| filler[8] | | | | | | | |
| filler[9] | 72.31 | 72.31 | 65.12 | 72.08 | 72.08 | 72.08 | 100.36 |
| filler[10] | 38.93 | 38.93 | 35.07 | 38.81 | 38.81 | 38.81 | 54.05 |
| anti-oxidant[11] | 0.70 | 0.7 | 0.62 | 0.69 | 0.69 | 0.69 | 0.96 |
| anti-oxidant[12] | 0.70 | 0.7 | 0.62 | 0.69 | 0.69 | 0.69 | 0.96 |
| pigment[13] | 1.39 | 1.39 | 1.25 | 1.39 | 1.39 | 1.39 | 1.93 |
| thixotrope[14] | | | | 2.31 | 2.31 | 2.31 | |
| thixotrope[15] | 2.31 | 2.31 | 2.09 | | | | 5.15 |
| plasticer[16] | 37.08 | 37.08 | 33.39 | 36.97 | 36.97 | 36.97 | 51.47 |
| additives[17] | | | | | | | |
| additive[18] | | | | | | | |
| catalyst[19] | 0.20 | 0.2 | 0.18 | 0.30 | 0.3 | 0.3 | 0.42 |
| catalyst[20] | | | | | | | |
| catalyst[21] | 0.46 | 0.46 | 0.58 | 0.3 | 0.3 | 0.3 | |
| total weight | 200.46 | 200.92 | 185.23 | 200.28 | 200.74 | 201.20 | 282.92 |
| PHYSICAL PROPERTIES | | | | | | | |
| Hardness | 23 | 27 | 20 | 18 | 18 | 16 | 7 |
| tensile, psi (MPa) | 134 (9.23) | 144 (9.92) | 122 (8.41) | 137 (9.44) | 137 (9.44) | 127 (8.75) | 73 (5.03) |
| mod 100% psi | 56 (3.86) | 63 (4.34) | 27 (1.86) | 40 (2.76) | 39 (2.69) | 40 (2.76) | 20 (1.38) |
| % elongation | 675 | 600 | 664 | 712 | 723 | 652 | 1034 |
| Peel wet concrete | | | | | | | |
| lb/in (N/mm) | 46 (8.06) | 25 (4.38) | 36 (6.30) | 27 (4.73) | 29 (5.08) | 28 (4.90) | 16 (2.80) |
| lb/in (N/mm) (repeat) | 30 (5.25) | 23 (4.03) | 25 (4.38) | 22 (3.85) | 33 (5.78) | 26 (4.55) | |
| % cohesive failure | 100 | 80 | 100 | 90 | 75 | 90 | 100 |
| % cohesive failure (repeat) | 95 | 95 | 95 | 45 | 80 | 85 | |

TABLE I-continued

The formulation of a composition of the present invention and the physical properties of cured composition.

|  | Ex. 9 | Ex. 10 | Ex. 11 | Ex. 12 | Ex. 13 | Ex. 14 | Ex. 15 |
|---|---|---|---|---|---|---|---|
| FORMULATION | | | | | | | |
| moisture-curable polymer (a)[1] | 52.33 | 56.53 | 56.53 | 34.79 | 34.79 | 34.79 | 55.76 |
| hydrocarbylalkoxysilane (b)[2] | | | 6.2 | | | | 5.85 |
| hydrocarbylalkoxysilane (b)[3] | 6.12 | | | | | | |
| hydrocarbylalkoxysilane (b)[4] | | 6.2 | | 6.25 | 7.19 | 9.09 | |
| adhesion promoter (c)[5] | 6.12 | 6.2 | 6.2 | 3.89 | 3.89 | 3.89 | 4.48 |
| desiccant[6] | 3.05 | 3.21 | 3.21 | 1.42 | 1.42 | 1.42 | 3.09 |
| filler[7] | | | | | | | |
| filler[8] | | | | | | | 150.07 |
| filler[9] | 100.36 | 107.46 | 107.46 | 74.22 | 74.22 | 74.22 | |
| filler[10] | 54.05 | 57.87 | 57.87 | 39.97 | 39.97 | 39.97 | |
| anti-oxidant[11] | 0.96 | 1.03 | 1.03 | | | | 0.94 |
| anti-oxidant[12] | 0.96 | 1.03 | 1.03 | | | | 0.94 |
| pigment[13] | 1.93 | 2.07 | 2.07 | 1.43 | 1.43 | 1.43 | 1.88 |
| thixotrope[14] | | | | | | | |
| thixotrope[15] | 5.15 | 5.51 | 5.51 | 2.38 | 2.38 | 2.38 | 5.00 |
| plasticer[16] | 51.47 | 55.11 | 55.11 | 38.06 | 38.06 | 38.06 | 47.95 |
| additives[17] | | | | | | | |
| additive[18] | | | | | | | |
| catalyst[19] | 0.28 | | | | | | |
| catalyst[20] | | 0.45 | 0.3 | 0.25 | 0.25 | 0.25 | 0.28 |
| catalyst[21] | 0.28 | | 0.3 | | | | 0.88 |
| total weight | 282.78 | 302.67 | 302.52 | 202.66 | 203.60 | 205.50 | 276.24 |
| PHYSICAL PROPERTIES | | | | | | | |
| Hardness | | 18 | | 17 | 20 | 20 | 24 |
| tensile, psi (MPa) | | 97 (6.68) | | 170 (11.7) | 190 (13.1) | 176 (12.1) | 100 (6.89) |
| mod 100% psi | | 36 (2.48) | | 39 (2.69) | 41 (2.83) | 40 (2.86) | 49 (3.38) |
| % elongation | | 800 | | 965 | 1155 | 1109 | 741 |
| Peel wet concrete | | | | | | | |
| lb/in (N/mm) | 25 (4.38) | 25 (4.38) | 24 (4.20) | 28 (4.90) | 36 (3.60) | 38 (6.65) | 30 (5.25) |
| lb/in (N/mm) (repeat) | | | | 27 (4.73) | 43 (7.53) | 28 (4.90) | |
| % cohesive failure | 85 | 75 | 25 | 100 | 100 | 100 | 90 |
| % cohesive failure (repeat) | | | | 40 | 100 | 60 | |

|  | Comp. Ex A | Comp. Ex. B |
|---|---|---|
| FORMULATION | | |
| moisture-curable polymer (a)[1] | 55.76 | 60.34 |
| hydrocarbylalkoxysilane (b)[2] | 5.85 | |
| hydrocarbylalkoxysilane (b)[3] | | 5.4 |
| hydrocarbylalkoxysilane (b)[4] | | |
| adhesion promoter (c)[5] | 4.48 | 6.98 |
| desiccant[6] | 3.09 | 1.26 |
| filler[7] | | 166.26 |
| filler[8] | 150.07 | |
| filler[9] | | |
| filler[10] | | |
| anti-oxidant[11] | 0.94 | 1.04 |
| anti-oxidant[12] | 0.94 | 1.04 |
| pigment[13] | 1.88 | 3.46 |
| thixotrope[14] | | |
| thixotrope[15] | 5.00 | 2.08 |
| plasticer[16] | 47.95 | 55.42 |
| additives[17] | 0.90 | |
| additive[18] | | 0.97 |
| catalyst[19] | | |
| catalyst[20] | 0.28 | 0.45 |
| catalyst[21] | 0.88 | |
| total weight | 277.14 | 304.70 |
| PHYSICAL PROPERTIES | | |
| Hardness | 23 | 14 |
| tensile, psi (MPa) | 87 (5.99) | 134 (9.23) |
| mod 100% psi | 49 (3.38) | 35 (2.41) |
| % elongation | 646 | 1151 |

TABLE I-continued

The formulation of a composition of the present invention and the physical properties of cured composition.

| Peel wet concrete | | |
|---|---|---|
| lb/in (N/mm) | 14 (2.52) | fail |
| lb/in (N/mm) (repeat) | | |
| % cohesive failure | 5 | fail |
| % cohesive failure (repeat) | | |

[1] Silylated polyurethane polymer prepared in Example 1.
[2] Octadecylmethyldimethoxysilane from Gelest, Inc under the trade name SIO6645.0.
[3] Octylmethyldimethoxysilane from Gelest, Inc. under the trade name SIO6712.4.
[4] Hexadecyltrimethoxysilane from Momentive Performance Materials Inc. under the trade name HDTMS.
[5] Trimethoxy-(3-oxiranylmethoxy-propyl)-silane from Momentive Performance Materials Inc. under the trade name Silquest™ A-187 silane.
[6] Trimethoxy-vinyl-silane from Momentive Performance Materials Inc. under the trade name Silquest™ A-171 silane.
[7] Surface treated ground calcium carbonate from Omya AG under the trade name Omyabond™ 520.
[8] Surface treated ground calcium carbonate from Omya AG under the trade name Omyacarb™ 5FT.
[9] Ultrafine coated precipitated calcium carbonate from Specialty Minerals, Inc. under the trade name Ultra Pflex™.
[10] Surface treated ground calcium carbonate from Specialty Minerals, Inc. under the trade name HiPflex™.
[11] Reaction products of methyl 3-(3-(2H-benzotriazole-2-yl)-5-t-butyl-4-hydroxyphenyl) propionate from BASF Corporation under the trade name Tinuvin™ 213.
[12] Butanedioic acid, polymer with l-(2-hydroxylethyl)-2,2,6,6-tetramethylpiperidin-4-ol from BASF Corporation under the trade name Tinuvin™ 622.
[13] Rutile titanium dioxide pigment from E. I. DuPont de Nemours and Company under the trade name Ti-Pure ®R-960.
[14] Surface modified fumed silica from Cabot Corporation under the trade name Cabosil™ TS 720.
[15] Polyamide wax from Cray Valley Ltd. Under the trade name Crayvallac™ SLX.
[16] Di-isododecyl phthalate plasticizer from Exxon Chemical under the trade name DIDP.
[17] Hydroxyl-terminated polydimethylsiloxane from Momentive Performance Materials Inc. under the trade name SE 4026.
[18] Dipropylene glycol from Sigma-Aldrich Company under the trade name D215554.
[19] Dibutyltine ketonate from Reaxis under the trade name Reaxis™ C226.
[20] Dibutyl tin oxide in dialkyl phthalate from Momentive Performance Materials Inc. under the trade name Fomrez™ Catalyst SUL-11B.
[21] Amino-functional oligosiloxane from Momentive Performance Materials Inc. under the trade name VX 225.

As shown in Table 1, Examples 2 to 15, good adhesions to unprimed concrete, as illustrated by the cohesive failure of greater than 20% and peel strengths in excess of 20 lb/in, were achieved when the sealant formulations according to the present invention were used. However, poor adhesions to unprimed concrete were observed when the formulations contain either hydroxyl-terminated polydimethylsiloxane or dipropylene glycol in addition to components (a), (b) and (c) described above, as demonstrated in comparative Examples A and B respectively.

While the invention has been described above with references to specific embodiments thereof, it is apparent that many changes, modifications and variations can be made without departing from the invention concept disclosed herein. Accordingly, it is intended to embrace all such changes, modifications, and variations that fall within the spirit and broad scope of the appended claims.

What is claimed is:

1. A moisture-curable resin composition comprising:
(a) at least one moisture-curable polymer having at least one hydrolysable silyl group;
(b) at least one hydrocarbylalkoxysilane represented by the general Formula (II)

$$R^6CH_2CHSi(CH_3)_c(OCH_3)_{3-c} \quad \text{Formula (II)}$$

wherein c is zero or 1, and $R^6$ is an alkyl or an alkenyl group of 2 to 18 carbon atoms;
(c) at least one silane adhesion promoter represented by the general Formula (III)

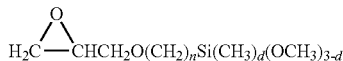

$$H_2C\text{—}CHCH_2O(CH_2)_nSi(CH_3)_d(OCH_3)_{3-d} \quad \text{Formula (III)}$$

wherein d is 0, 1, or 2, and n is 2 to 6;
wherein
(i) the amount of said component (b) present in the moisture-curable resin composition is from about 5 to about 35 weight percent based upon the weight of said component (a);
(ii) the amount of said component (c) present in the moisture-curable resin composition is from about 1 to about 25 weight percent based upon the weight of said component (a);
(iii) the total amount of said component (b) and said component (c) present in the moisture-curable resin composition is from about 10 to about 45 weight percent based upon the weight of said component (a);
with the provisos that
(i) the moisture-curable resin composition is substantially free of hydroxyl-terminated dimethyl siloxane; and
(ii) the moisture-curable resin composition is substantially free of low molecular weight glycols having the Formula (V):

$$HO[(CR^7{}_2)_mO]_yH \quad (V)$$

wherein $R^7$ is hydrogen or an alkyl group of from 1 to 4 carbon atoms, m is an integer of from 2 to 6 and y is an integer from 1 to 4.

2. The moisture-curable resin composition of claim 1, wherein said component (a) has the general Formula (I):

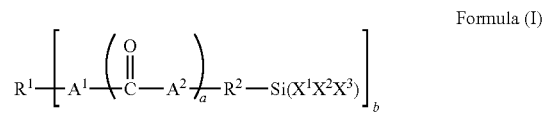

$$R^1\text{—}\left[A^1\text{—}\left(\overset{O}{\overset{\|}{C}}\text{—}A^2\right)_a\text{—}R^2\text{—}Si(X^1X^2X^3)\right]_b \quad \text{Formula (I)}$$

wherein
$R^1$ is independently a monovalent or polyvalent organic polymer fragment having a number average molecular weight of from 500 to 25,000 grams per mole (g/mol);
each occurrence of $R^2$ is independently a divalent hydrocarbylene group containing from 1 to 12 carbon atoms;
each occurrence of $A^1$ is independently selected from divalent oxygen (—O—), sulfur (—S—) or the structure $(-)_nNR^3$, wherein $R^3$ is hydrogen, alkyl, alkenyl, arenyl, aryl, aralkyl, alkyl containing at least one ester functional group or —$R^2SiX^1X^2X^3$ group, wherein each $R^3$, other than hydrogen, contains from 1 to 18 carbon atoms, and with the provisos that when A' is oxygen or sulfur, then $A^2$ is $(-)_2NR^3$ and when a is 0, then $A^1$ is oxygen;

each occurrence of $A^2$ is independently selected from divalent oxygen (—O—), sulfur (—S—) or the structure $(-)_nNR^3$, wherein $R^3$ is hydrogen, alkyl, alkenyl, arenyl, aryl, aralkyl, alkyl containing at least one ester functional group or —$R^2SiX^1X^2X^3$ group, wherein each $R^3$, other than hydrogen, contains from 1 to 18 carbon atoms, and with the proviso that when $A^2$ is oxygen or sulfur, then $A^1$ is $(-)_2NR^3$;

each occurrence of $X^1$ is independently $R^4O$—, wherein each $R^4$ is independently selected from the group consisting of hydrogen, alkyl, alkenyl, arenyl, aryl, and aralkyl groups, wherein each $R^4$, other than hydrogen, contains from 1 to 18 carbon atoms and, optionally, contains at least one oxygen or sulfur atom;

each occurrence of $X^2$ and $X^3$ is independently selected from the group consisting of $R^4O$— and $R^5$ wherein each $R^4$ is independently selected from the group consisting of hydrogen, alkyl, alkenyl, arenyl, aryl, and aralkyl, wherein each $R^4$, other than hydrogen, contains from 1 to 18 carbon atoms and, optionally, contains at least one oxygen or sulfur atom and each $R^5$ is independently an alkyl group containing from 1 to 6 carbon atoms; and, each occurrence of subscripts a and b is independently an integer wherein a is 0 or 1 and b is 1 to 6.

3. A moisture-curable resin composition of claim 2, wherein said component (a) is derived from a polyol reactant or a combination of polyol reactants and optionally contain at least one organic functional group selected from the group consisting of urethane, thiourethane, urea, biuret, ester, thioester, ether, thioether, and amide.

4. The moisture-curable resin composition of claim 3, wherein the polyol reactant has a number average molecular weight of from 300 to 24,000 grams per mole (g/mol).

5. The moisture-curable resin composition of claim 2, wherein $R^1$ is a polymer fragment having a number average molecular weight from 500 to 25,000 grams per mole, $R^2$ is an alkylene of from 1 to 3 carbon atoms; $A^1$ is oxygen or the structure $(-)_2NR^3$, wherein $R^3$ is hydrogen; $A^2$ is the structure $(-)_2NR^3$, wherein $R^3$ is hydrogen, alkyl or aryl, wherein each $R^3$, other than hydrogen, contains 1 to 10 carbon atoms; $X^1$ and $X^2$ are methoxy, ethoxy or propoxy; and $X^3$ is methyl, methoxy, ethoxy or propoxy.

6. The moisture-curable resin composition of claim 2, wherein the moisture-curable polymer (a) is prepared by reacting a polyol or a combination of polyols with a hydrolysable silane containing an isocyanate group, wherein the molar ratio of —NCO of the hydrolysable silane containing an isocyanate group to —OH of the polyol or combination of polyols is from 0.3 to 1.2.

7. The moisture-curable resin composition of claim 6, wherein the hydrolysable silane is selected from the group consisting of isocyanatomethyltrimethoxysilane, isocyanatomethylmethydimethoxysilane, 3-isocyanatopropyltrimethoxysilane, 3-isocyanatoisopropyltrimethoxysilane, 4-isocyanatobutyltrimethoxysilane, 2-isocyanato-1,1-dimethylethyltrimethoxysilane, 3-isocyanatopropyltriethoxysilane, 3-isocyanatoisopropyltriethoxysilane, 4-isocyanatobutyltriethoxysilane, 2-isocyanato-1,1-dimethylethyltriethoxysilane, 3-isocyanatopropylmethyldimethoxysilane, 3-isocyanatoisopropyldimethylmethoxysilane, 4-isocyanatobutylphenyldimethoxysilane, 2-(4-isocyanatophenyl)ethylmethyldimethoxysilane, and mixtures thereof.

8. The moisture-curable resin composition of claim 1, wherein said component (a) is represented by generic Formula (VII):

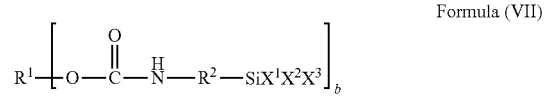

Formula (VII)

wherein $R^1$ is an organic polymer fragment containing at least a urethane group as a result of the reaction of a polyol with an isocyanate group, and has a number average molecular weight of 4,000 to 18,000 grams per mole, each occurrence of $R^2$ is independently a divalent hydrocarbylene group containing from 1 to 12 carbon atoms, each occurrence of $X^1$ is independently $R^4O$—, wherein each $R^4$ is independently selected from the group consisting of hydrogen, alkyl, alkenyl, arenyl, aryl, and aralkyl groups, wherein each $R^4$, other than hydrogen, contains from 1 to 18 carbon atoms and, optionally, contains at least one oxygen or sulfur atom; each occurrence of $X^2$ and $X^3$ is independently selected from the group consisting of $R^4O$— and $R^5$ wherein each $R^4$ is independently selected from the group consisting of hydrogen, alkyl, alkenyl, arenyl, aryl, and aralkyl, wherein each $R^4$, other than hydrogen, contains from 1 to 18 carbon atoms and, optionally, contains at least one oxygen or sulfur atom and each $R^5$ is independently an alkyl group containing from 1 to 6 carbon atoms, and b is 2.

9. The moisture-curable resin composition of claim 8, wherein component (a) is a silylated polyurethane prepared by a process comprising: (A) reacting a polyol component with a diisocyanate component at a stoichiometric excess of the polyol component to the diisocyanate component to form a hydroxyl-terminated polyurethane; and (B) reacting the hydroxyl-terminated polyurethane with one or more isocyanate silanes of the formula OCN—$R^2$—$SiX^1X^2X^3$, wherein each occurrence of $R^2$ is independently a divalent hydrocarbylene group containing from 1 to 12 carbon atoms, each occurrence of $X^1$ is independently $R^4O$—, wherein each $R^4$ is independently selected from the group consisting of hydrogen, alkyl, alkenyl, arenyl, aryl, and aralkyl groups, wherein each $R^4$, other than hydrogen, contains from 1 to 18 carbon atoms and, optionally, contains at least one oxygen or sulfur atom; and each occurrence of $X^2$ and $X^3$ is independently selected from the group consisting of $R^4O$— and $R^5$ wherein each $R^4$ is independently selected from the group consisting of hydrogen, alkyl, alkenyl, arenyl, aryl, and aralkyl, wherein each $R^4$, other than hydrogen, contains from 1 to 18 carbon atoms and, optionally, contains at least one oxygen or sulfur atom and each $R^5$ is independently an alkyl group containing from 1 to 6 carbon atoms.

10. The moisture-curable resin composition of claim 9 wherein the polyol is selected from the group consisting of hydroxyl-terminated polypropylene oxide, hydroxyl-terminated polyethylene oxide, hydroxyl-terminated polybutylene oxide, and combinations thereof.

11. The moisture-curable resin composition of claim 10 wherein the diisocyanate is selected from the group consisting of 2,4-toluene diisocyanate, 2,6-toluene diisocyanate, a mixture of 2,4- and 2,6-toluene diisocyanate isomers, 4,4' diphenyl-methanediisocyanate, isophorone diisocyanate, dicyclohexylmethane-4,4'-diisocyanate, liquid diphenylmethane-diisocyanates containing a mixture of 2,4- and 4,4' isomers, and combinations thereof.

12. The moisture-curable resin composition of claim 1, wherein said component (b) is selected from the group consisting of butyl-trimethoxy-silane, sec-butyl-tiimethoxy-silane, hexyl-trimethoxy-silane, hexyl-dimethoxy-methyl-silane, hex-5-enyl-trimethoxy-silane, hex-5-enyl-dimethoxy-methyl-silane, trimethoxy-octyl-silane, dimethoxy-methyl-octyl-silane, decyl-trimethoxy-silane, decyl-dimethoxy-methyl-silane, dodecyl-trimethoxy-silane, dodecyl-dimethoxy-methyl-silane, hexadecyl-trimethoxy-silane, hexadecyl-dimethoxy-methyl-silane, octadecyl-trimethoxy-silane, dimethoxy-methyl-octadecyl-silane, dimethoxy-methyl-eicosyl-silane, trimethoxy-methyl-eicosyl-silane, and combinations thereof.

13. The moisture-curable resin composition of claim 11, wherein said component (c) is selected from the group consisting of trimethoxy-(3-oxiranylmethoxy-propyl)-silane, dimethoxy-methyl-(3-oxiranylmethoxy-propyl)-silane, and combinations thereof.

14. The moisture-curable composition of claim 1 wherein the composition is substantially free of aminofunctional alkoxysilanes.

15. The moisture-curable composition of claim 1 further comprising at least one additive selected from the group consisting of a catalyst for catalyzing the reaction between said component (a) with water under curing conditions, a filler, a plasticizer, and combinations thereof.

16. The moisture-curable composition of claim 15 further comprising at least one additive selected group the group consisting of pigments, thixotropes, waxes, anti-sagging agents, stabilizers, viscosity modifiers, and combinations thereof.

17. A cured composition produced by contacting the composition of claim 1 with water.

18. A moisture-curable sealant, adhesive or coating containing the moisture-curable resin composition of claim 1.

19. A method for treating a substrate comprising:
(a) providing a composition of claim 1;
(b) applying said composition to a surface of the substrate.

20. The method of claim 19 wherein the substrate is concrete.

21. An article comprising the cured moisture-curable resin composition of claim 1 and an unprimed concrete substrate to which the cured moisture-curable resin composition is bonded.

22. The article of claim 21 wherein the article has a peel strengths of from 1.80 to 8.90 N/mm (10 to 50 lb/in) after exposure to water for seven days when the article is tested according to ASTM C-794-06.

* * * * *